United States Patent [19]

Lahoti

[11] Patent Number: 5,295,581

[45] Date of Patent: Mar. 22, 1994

[54] PROCESS FOR PREPARING DRY SODIUM ALUMINUM HYDRIDE

[75] Inventor: Sanjeev Lahoti, Houston, Tex.

[73] Assignee: Ethyl Corporation, Richmond, Va.

[21] Appl. No.: 972,761

[22] Filed: Nov. 5, 1992

[51] Int. Cl.$^5$ ................................................. B03B 1/00
[52] U.S. Cl. ........................................... 209/3; 209/5
[58] Field of Search ......................... 209/3, 5, 7, 44; 23/313 R

[56] References Cited

U.S. PATENT DOCUMENTS

| | | | |
|---|---|---|---|
| 3,138,433 | 6/1964 | Del Giudice | 23/14 |
| 3,210,150 | 10/1965 | Powers | 23/14 |
| 3,387,933 | 6/1968 | Snyder | 23/204 |
| 3,387,949 | 6/1968 | Snyder | 23/365 |
| 3,505,036 | 4/1970 | Lindsay | 23/365 |
| 3,556,740 | 1/1971 | Murib | 23/365 |
| 4,045,545 | 8/1977 | Ashby | 423/644 |
| 4,081,524 | 3/1978 | Ashby | 423/644 |
| 4,087,254 | 5/1978 | Takewell | 23/313 R |
| 4,162,966 | 7/1979 | Finch | 209/5 X |
| 4,210,531 | 7/1980 | Wang et al. | 209/5 X |
| 4,231,868 | 11/1980 | Wang et al. | 209/5 X |
| 4,323,365 | 4/1982 | Crosby et al. | 209/5 X |
| 4,456,584 | 6/1984 | Gautreaux | 423/644 |
| 4,528,176 | 7/1985 | Nelson | 423/644 |
| 4,529,580 | 7/1985 | Nelson | 423/644 |
| 4,563,343 | 10/1986 | Nelson | 423/644 |
| 4,790,985 | 12/1988 | Nelson | 423/644 |
| 4,904,373 | 2/1990 | Miller et al. | 209/5 X |

FOREIGN PATENT DOCUMENTS

| | | | |
|---|---|---|---|
| 0129079 | 12/1984 | European Pat. Off. | |
| 1084700 | 7/1960 | Fed. Rep. of Germany | |
| 0186988 | 11/1966 | U.S.S.R. | |
| 1105167 | 3/1968 | United Kingdom | |
| 1185707 | 3/1970 | United Kingdom | |
| 1514010 | 6/1978 | United Kingdom | 23/313 R |

OTHER PUBLICATIONS

Chemical Abstracts–100:105928v–Manufacture of hydrided alkali metal complexes vol. 100 (1984), Apr. No. 14.

Chemical Abstracts–101:75264b–Sodium aluminum hydride vol. 101, 1984.

PCT Gazette Abstract–"Alkali Metal Aluminum Hydride Production" Int. Appl. No. PCT/US83/01984, Filed Dec. 13, 1983.

"Alanat-Synthese aus den Elementen und ihre Bedeutung" by Dr. H. Classen Angew. Chem./73. Jahrg. 1961/Nr. 10.

"A Direct Route to Complex Metal Hydrides" By E. C. Ashby Chemistry and Industry, Feb. 3, 1962, pp. 208–209.

"Direct Synthesis of Complex Metal Hydrides" By E. C. Ashby, G. J. Brendel and H. E. Redman Inorganic Chemistry, vol. 2, No. 3, Jun. 1963, pp. 499–504.

"Alanate Synthesis from the Elements and Its Significance" by Dr. H. Clasen Angewandte Chemie 73, 322–331 (1961).

"The Direct Synthesis of Na$_3$AlH$_6$" by E. C. Ashby and P. Kobetz Inorganic Chemistry, vol. 5, No. 9, Sep. 1966, Notes 1616–1617.

"The Direct Synthesis of Sodium and Potassium Aluminum Hydrides From the Elements" by L. I. Zakharkin and V. V. Gavrilenko, Inst. of Heteroorganic Cmpds, Acad. of Sc. USSR, Feb. 19, 1962.

Primary Examiner—Cheryl L. Gastineau
Attorney, Agent, or Firm—Edgar E. Spielman, Jr.

[57] ABSTRACT

This invention relates to a process for obtaining dry sodium aluminum hydride from a slurry containing the production products from a sodium aluminum hydride plant.

3 Claims, No Drawings

PROCESS FOR PREPARING DRY SODIUM ALUMINUM HYDRIDE

BACKGROUND OF THE INVENTION

This invention relates to dry sodium aluminum hydride and a process for its manufacture Sodium aluminum hydride, NaAlH$_4$, is a powerful reducing agent and as such has numerous applications in the chemical and pharmaceutical industries.

Commercially, sodium aluminum hydride, hereinafter SAH, is produced by "direct synthesis", that is, in accordance with the following reaction, $$Na + Al + 2H_2 \rightarrow NaAlH_4.$$

The reaction occurs at elevated temperature and pressure, e.g. 285° F. and 2000 psig, and in the presence of a rate promoting amount of titanium which is introduced to the reaction mass along with the aluminum. A catalyst, NaAlH$_2$(C$_2$H$_5$)$_2$, is also used. This catalyst can be produced in situ by the reaction of triethyl aluminum with the sodium, aluminum and hydrogen which are already in the reaction mass. The reaction takes place in a toluene reaction medium which forms a slurry with the SAH solid product. This slurry will also contain some aluminum, catalyst and by-product sodium aluminum hexahydride, Na$_3$AlH$_6$. While the SAH product can be kept in the slurry for storage and shipping purposes it must be realized that the slurry is not stable in air and will react violently if it comes in contact with any moisture. Furthermore, the slurry is subject to settling-out, is not always the easiest medium to pump and, because of its liquid component, requires a large storage volume.

As an alternative, the SAH can be stored, shipped etc, in solution with a solvent, such as dimethoxy ethane. This technique answers some of the objections associated with a slurry, but still will require a large storage volume. Also, the use of such ether solvents presents a safety hazard as SAH forms an explosive mixture with ether solvents at relatively low temperatures.

Therefore, there is a need for an SAH product which can be stored, shipped and used safely without any of the problems associated with SAH slurries or solutions.

THE INVENTION

This invention relates to a process for recovering storable and shippable dry SAH from a slurry comprised of sodium aluminum hydride, aluminum, sodium aluminum hexahydride, sodium aluminum diethyldihydride and toluene. The process features feeding the slurry to a nutsche filter and then pressurizing the nutsche filter with an inert gas so as to obtain a pressure differential over the filter septum within the range of from about 30 to about 50 psi. After the pressure differential has been established the fed slurry is not agitated as it filters to yield a first filter cake. Once the first filter cake has been formed, a sufficient amount of toluene is fed to the nutsche filter to form a wash slurry so as to effect a washing of the first filter cake. The wash slurry is not agitated as it filters to form a second filter cake. The second filter cake is heated to a temperature within the range of from about 35° C. to about 75° C. until the second filter cake reaches the desired degree of dryness. A preferred drying range is from about 37° C. to about 71° C. The resultant dried filter cake is then recovered from the nutsche filter and is suitable for shipping or storage.

The slurry is initially and generally comprised of from about 33 to about 36 wt % sodium aluminum hydride, from about 3 to about 5 wt % aluminum, from about 0.5 to about 2 wt % sodium aluminum hexahydride, from about 0.01 to about 0.1 wt % sodium aluminum diethyldihydride and from about 60 to about 65 wt % toluene. In the slurry form the aluminum, sodium aluminum hexahydride, and the diethyl sodium aluminum hydride can provide an ignition source, for the toluene, if exposed to air.

The nutsche filter to which the slurry is fed, is conventional in design and is sized to handle the slurry charge fed to it. The filter's false bottom is preferably constructed of carbon steel and has a porosity sufficient to pass particles up to about 60 micron. The false bottom supports the filter cake, which cake then acts as the filtering medium. The false bottom and the filter cake are referred to as the septum. The filter cake is allowed to build to a height of from about 8 to about 13 inches. The pressure differential across the septum is obtained by pressurizing the upstream side of the septum with an inert gas, say nitrogen, argon and the like. The nutsche is fitted with a vertically movable agitator. The agitator can act to agitate the slurry and to break-up and stir the filter as needed. When the filter cake is being formed the agitator is moved to a position above the cake.

To form the first filter cake, the slurry is fed to the nutsche filter at a controlled rate with the fed slurry being stirred with the agitator. As the first filter cake builds in height, the agitator is moved ahead and above the cake. After the first filter cake has been formed, toluene is added to the nutsche filter to effect a washing of the cake. The wash toluene generally will be used in an amount of from about 0.75 to about 1 pounds per pound of first filter cake. During the wash the agitator is lowered so as to contact the cake and break it up so as to form a wash slurry. The so formed slurry then filters with no agitation to yield a second filter cake having a thickness similar to the first filter cake. The filtration of the wash slurry preferentially occurs under the same or near the same pressure differential used in forming the first filter cake.

The second filter cake is then heated to dryness, i.e. it contains less than about 1000 ppm toluene. The heating is preferably accomplished by means of hot inert gas being passed through the second filter cake. To facilitate this passage the agitator should be lowered so that the cake will be broken-up. Preferably the inert gas is nitrogen and has a drying temperature as recited above. Preferably, the second filter cake is dried to contain between about 50 and about 1000 ppm toluene. The drying gas can be sent to a condenser to recover the removed toluene.

Agitating the filtering slurry has been found to be very detrimental to the filtration rate. Stopping the agitator increases the filtration rate and reduces filtration time.

The dried second filter cake is conveniently removed from the nutsche filter by lowering the agitator to break up the dried cake so that it can be swept from the filter's false bottom. The removed dried SAH contains little pyrophoric material and thus has enhanced stability.

The dried removed SAH is then preferably stored in containers which have means for preventing at least substantial air and water contact with the contained solids. It is preferred that the means be a bag constructed of thermoplastic film, e.g. polyvinyl chloride, polyethylene, etc. The bag is designed and dimensioned to fit into the container with which it is associated. To insure protection for the stored SAH, it is preferred that these bags be constructed of a double layer of film. The container, and thus, the associated bag, can be filled with the dry SAH under an inert atmosphere, e.g. nitrogen, argon, etc. The dry filter cake is swept through an outlet above the filter media and directly connected to the container lid by a flexible duct. The entire system is under an inert atmosphere with a slight positive pressure from about 5 to 30 inches of water. The pressure prevents contact with air and water while the solids are being drummed.

The dried SAH which is to be put in a container and ultimately shipped should be comprised of from about 80 to about 98 wt % sodium aluminum hydride, from about 1 to about 15 wt % aluminum, from about 0.5 to about 5 wt % sodium aluminum hexahydride, and from about 0 to about 1 wt % sodium aluminum diethyldihydride.

The process of this invention is applicable for obtaining dry SAH from most any slurry which contains the production products from a SAH process. See U.S. Pat. No. 4,456,584, U.S. Pat. No. 4,528,176 and U.S. Pat. No. 4,790,985 for examples of SAH processes.

What is claimed is:

1. A process for recovering storable and shippable dry sodium aluminum hydride solids from a slurry comprised of sodium aluminum hydride, aluminum, sodium aluminum hexahydride, sodium aluminum diethyldihydride and toluene, the process comprising:
    a. feeding the slurry to a nutsche filter;
    b. pressurizing the nutsche filter with an inert gas so as to obtain a pressure differential over the filter septum within the range of from about 30 to about 50 psi;
    c. filtering the fed slurry in the absence of agitation to yield a first filter cake;
    d. feeding a sufficient amount of toluene to the nutsche filter to form a wash slurry to effect a washing of the first filter cake;
    e. filtering the fed slurry in the absence of agitation to yield a second filter cake;
    f. heating the second filter cake to a temperature within the range of from about 35° C. to about 75° C. until the second filter cake reaches the desired degree of dryness; and
    g. recovering the dried filter cake from the nutsche filter.

2. The process of claim 1 wherein the inert gas is nitrogen.

3. The process of claim 1 wherein the slurry initially contains from about 33 to about 36 wt % sodium aluminum hydride, from about 3 to about 5 wt % aluminum, from about 0.5 to about 2 wt % sodium aluminum hexahydride, from about 0.01 to about 0.1 wt % sodium aluminum diethyldihydride and from about 60 to about 65 wt % toluene.

* * * * *